United States Patent [19]
Bystry et al.

[11] Patent Number: 5,611,583
[45] Date of Patent: Mar. 18, 1997

[54] CABLE LOCK AND SEAL WITH COILED SPRING

[75] Inventors: Jerry Bystry, Orland, Ind.; Alan Becker, Edon, Ohio

[73] Assignee: Brammall, Inc., Angola, Ind.

[21] Appl. No.: 558,728

[22] Filed: Nov. 16, 1995

[51] Int. Cl.⁶ .................................................. B65D 33/34
[52] U.S. Cl. ........................... 292/307 R; 24/136 A; 292/320
[58] Field of Search ............................ 70/38 B, DIG. 54; 292/307 R, 308–313, 318–321, 323; 24/136 A, 115 L, 488

[56] References Cited

U.S. PATENT DOCUMENTS

| | | | |
|---|---|---|---|
| 830,565 | 9/1906 | Brown | 292/307 R |
| 1,139,595 | 5/1915 | Starr | 24/488 X |
| 3,204,311 | 9/1965 | Laviano | 24/115 L |
| 3,770,307 | 11/1973 | Van Gompel | 292/307 R |
| 4,074,916 | 2/1978 | Schindler | 292/307 R |
| 4,747,631 | 5/1988 | Loynes et al. | 292/307 R |
| 5,092,641 | 3/1992 | Penick, Jr. | 292/307 R |
| 5,147,145 | 9/1992 | Facey et al. | 24/136 A X |
| 5,222,776 | 6/1993 | Georgopoulos et al. | 292/307 R X |
| 5,352,003 | 10/1994 | Bystry | 292/323 |

FOREIGN PATENT DOCUMENTS

| | | | |
|---|---|---|---|
| 18406 | 4/1914 | France | 24/115 L |
| WO93/18316 | 9/1993 | WIPO | 24/115 L |

*Primary Examiner*—Lloyd A. Gall
*Attorney, Agent, or Firm*—Hill, Steadman & Simpson

[57] ABSTRACT

An improved locking device which has a body member with a cable which has one end attached to the body member and a second end of the cable which can be inserted into the body member in a first direction but which cannot be withdrawn in a second direction. An improved spiral spring biases a disc that rides on a ramp into engagement with the second end of the cable so as to lock it so it cannot be withdrawn from the body member, the coil spring provides a simple and efficient biasing device.

2 Claims, 1 Drawing Sheet

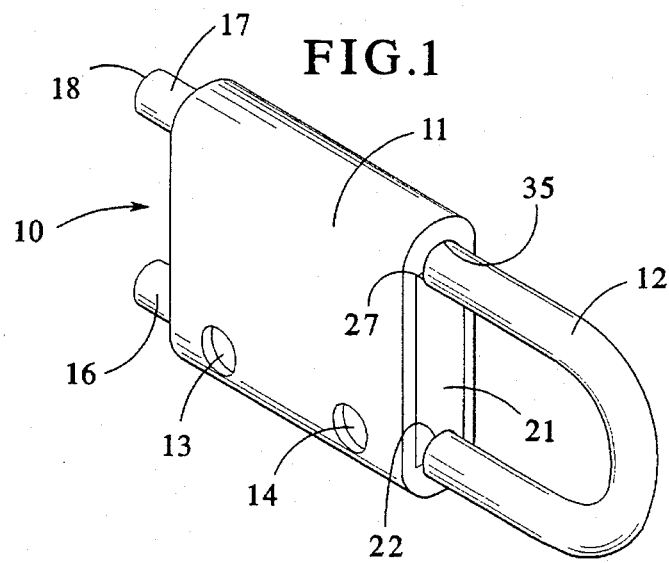
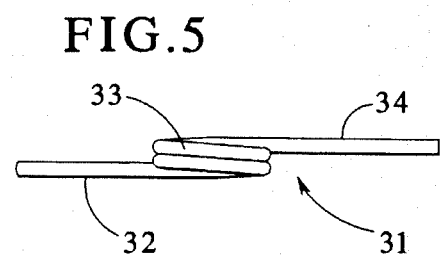
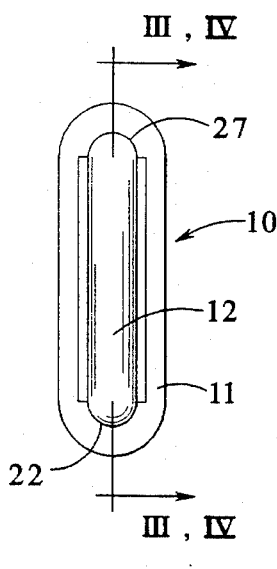
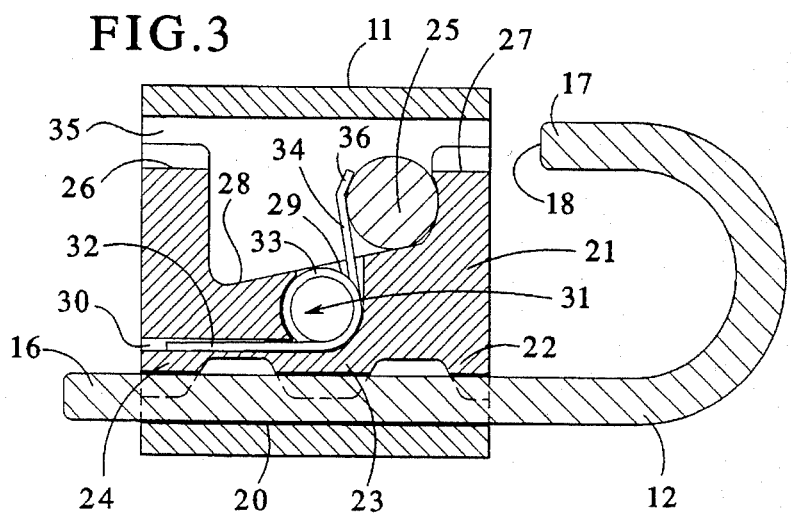
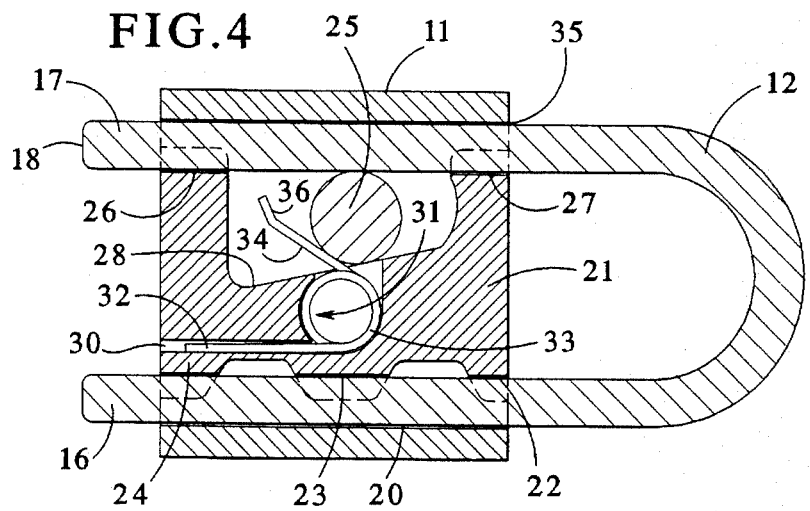

CABLE LOCK AND SEAL WITH COILED SPRING

BACKGROUND OF THE INVENTION

1. Field of the Invention

This invention relates in general to a locking device and in particular to a locking device which has a cable with one end firmly attached to a body member and a second end which can be inserted into the body member in a first direction but which cannot be withdrawn from the body member in a second direction so as to provide a locking device wherein the cable can be inserted through a hasp or other device to lock it and the cable cannot be removed from the locking body.

2. Description of Related Art

The present invention is an improvement on U.S. Pat. Nos. 3,770,307, 4,074,916, 4,747,631, 5,092,641 and 5,352,003 assigned to the assignee of the present invention.

SUMMARY OF THE INVENTION

The present invention comprises an improved locking device which has a body member with one end of a cable permanently attached by staking or other means to the body member and which has a second end of the cable that can be inserted into an opening in the body member and moved through in a first direction but which cannot be removed from the body member in the second or opposite direction so as to provide a locking device for the cable which prevents the cable from being withdrawn after it has been inserted through the locking device. The present invention relates to an improved spring and spring holding means within the body member.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a perspective view of the locking device of the invention;

FIG. 2 is a top view of the invention;

FIG. 3 is a sectional view of the invention;

FIG. 4 is a sectional view of the invention with the end of the cable inserted into the locking body; and FIG. 5 illustrates the improved spring of the invention.

DETAILED DESCRIPTION OF THE PREFERRED EMBODIMENTS

FIG. 1 is a perspective view of the locking device 10 of the invention which has a body member 11 through which the first end 16 to a cable extends through and which is locked to the body member 11 and an inner member 21 by staking 13 and 14. The inner member 21 is mounted within the body member 11. The outer edges of body member 11 are formed with openings 22 and 27 which extend therethrough and the inner member 21 fits inside the outer body member 11 and is formed with arcuately shaped extending portions 23 and 24 through which the end 16 of the cable 12 extends. Extending portions 26 and 27 formed on the other side of the internal member 21 are arcuately shaped so as to partially define the opening 35. Between the extending portions 26 and 27 in member 21, a ramp 28 is formed which tapers upwardly from the left to the right relative to FIGS. 3 and 4. A disc 25 is mounted between the extending portions 26 and 27 and rides on the ramp 28. An opening 29 is formed in the inner member 21 and coil spring 31 is mounted therein. The coil spring 31 has a coiled portion 33 and a first extending end 32 that is received in an opening 30 in member 21 and which communicates with the opening 29. A second end 34 of the coil spring is formed with a bent end 36 which engages the disc 25.

FIG. 3 illustrates the locking device before the end 17 of the cable 12 has been inserted into the opening 35 and it is seen that the disc 25 is biased by the end 36 of the spring 31 to the right against the extension 27 as shown in FIG. 3. As the end 17 is inserted into the opening 35, the cable engages the disc 25 and moves it against the tension of the spring 31 to the left down the ramp as shown in FIG. 4 and the extending end 34 of the spring biases the disc 25 toward the right relative to FIGS. 3 and 4. It is to be noted that the end 17 of the cable 12 can be moved through the opening 35 of the locking device in a direction from the right to the left relative to FIGS. 3 and 4. However, the end 17 of the cable 12 cannot be moved in a direction from the left to the right relative to FIG. 4 because on initiation of movement of the cable in that direction, the disc 25 will move up the ramp 28 and embed into the cable 12 so as to prevent the end 17 from being withdrawn from the locking device. Thus, there is provided a locking means including an improved spring which allows the end 17 of the cable to be inserted into the opening 35 and moved in a first direction but which prevents the end 17 of the cable from being removed from the body member 11 in the other direction. Thus, in use, the end 17 of the cable 12 can be passed through a hasp or other means and then inserted into the body member 11 after which the loop of the cable 12 provides a lock which cannot be removed, since the end 17 cannot be withdrawn from the locking member once it has been inserted therein. Thus, the device provides an improved locking means. The spiral spring 31 with ends 32 and 34 provides a simple and efficient manner of biasing the disc 25 up the ramp 28 and into locking engagement with the cable 12.

Although the invention has been described with respect to preferred embodiments, it is not to be so limited as changes and modifications can be made which are within the full intended scope of the invention as defined by the appended claims.

We claim as our invention:

1. A cable lock and seal device comprising, a body member, a cable with one fixed end attached to said body member, an inner member fixedly mounted within said body member and an opening defined by said body member and said inner member, an inclined ramp formed on said inner member, a disc movably mounted on said ramp, a coiled spring, said coiled spring including a substantially circular portion received in a second opening formed in said inner member, said second opening intersecting said ramp at a location substantially midway along said ramp, said coiled spring further including a substantially straight end extending outwardly of said second opening which engages said disc so as to bias it up said inclined ramp, and the second end of said cable insertable into said opening so as to push said disc down said ramp.

2. A cable lock and seal device according to claim 1 wherein said coiled spring has a second end which is attached to said inner member.

* * * * *